(12) United States Patent
Lin

(10) Patent No.: US 7,068,813 B2
(45) Date of Patent: Jun. 27, 2006

(54) METHOD AND APPARATUS FOR EYE GAZING SMART DISPLAY

(75) Inventor: Yun-Ting Lin, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 189 days.

(21) Appl. No.: 09/820,058

(22) Filed: Mar. 28, 2001

(65) Prior Publication Data

US 2002/0141614 A1    Oct. 3, 2002

(51) Int. Cl.
*G06K 9/00* (2006.01)

(52) U.S. Cl. .................. 382/103; 382/299; 351/209

(58) Field of Classification Search ............... 382/103, 382/117, 299
See application file for complete search history.

(56) References Cited

U.S. PATENT DOCUMENTS 6,173,069 B1    1/2001    Daly et al. ............... 382/118

6,407,724 B1 *  6/2002    Waldern et al. .............. 345/8

FOREIGN PATENT DOCUMENTS

| EP | 0816983 A2 | 1/1998 |
| JP | 1078025 | 3/2001 |
| WO | WO0079759 | 12/2000 |

OTHER PUBLICATIONS

"A real-time foveated multiresolution system for low-bandwidth video communication" by Geisler et al. In B. Rogowitz and T. Pappas (Eds.), Human Vision and Electronic Imaging, SPIE Proceedings, 3299, pp. 1-13.*

"Variable-Resolution Displays for Visual Communication and Simulation" by Perry et al. The Society for Information Display, 30 pp. 420-423.*

* cited by examiner

*Primary Examiner*—Samir Ahmed
*Assistant Examiner*—Charles Kim
(74) *Attorney, Agent, or Firm*—Michael E. Belk

(57) ABSTRACT

The present invention is a method and apparatus for enhancing a perceived video quality (e.g. higher resolution) on a display in a region surrounding an intersection point of a user's gaze onto a screen of the display.

3 Claims, 2 Drawing Sheets

METHOD AND APPARATUS FOR EYE GAZING SMART DISPLAY

BACKGROUND OF THE INVENTION

1. Technical Field

The present invention relates to a method and apparatus for enhancing the perceived video quality on a display.

2. Related Art

Eye tracking devices generally are based upon the principal that the direction of a person's gaze is directly related to the relative position of a pupil of an eye of a person. These eye tracking devices may include processing capabilities that operate on a video image of the eye to determine the gaze direction of the eye. These image processing capabilities are enhanced by using a bright eye affect. The bright eye affect is a result of the highly reflective nature of a retina of the eye. The characteristic of the retina causes that a significant amount of a light that enters an eye is reflected back through the pupil. When light shines into an eye along the axis of a camera lens, the retina reflects a significant portion of the light back to the camera. The pupil appears as a bright disk to the camera. This effect allows the pupil to be readily imaged and tracked. Eye tracking devices have been used for weapon control, market research, and as enablement for the disabled.

SUMMARY OF THE INVENTION

The present invention provides a display system for providing a high resolution area in a region where a user is looking at a display screen of a display device.

The present invention provides an apparatus comprising:
an eye tracking system for determining an eye-gaze direction line of a user looking at a display screen of a display device;
an eye-gaze tracking module for extracting the eye-gaze direction from the eye tracking system and for determining an intersection point where the eye-gaze direction line intersects with the display screen;
wherein the eye-gaze tracking module sends the intersection point data to a scalable video decoder; and
wherein the scalable video decoder receives an encoded video stream and provides a first set of higher video resolution data to a first region surrounding the intersection point on the display screen and a second set of lower video resolution data to a second region of the video screen.

Another embodiment of the apparatus of the present invention comprises:
an eye tracking system for determining an eye-gaze direction line of a user looking at a display screen of a display device;
an eye-gaze tracking module for extracting the eye-gaze direction from the eye tracking system and for determining an intersection point where the eye-gaze direction line intersects with the display screen;
wherein the eye-gaze tracking module sends the intersection point data to a scalable video encoder; and
wherein the scalable video encoder receives a source video stream and provides an encoded first set of higher video resolution data to a remote video decoder and an encoded second set of lower video resolution data is provided to the remote video decoder.

The present invention provides a method comprising:
providing a display screen;
determining an eye-gaze direction line of a user looking at the display screen;
determining an intersection point where the eye-gaze direction line intersects with the display screen;
providing a video stream to a scalable video device; and
wherein the scalable video device provides a first set of higher video resolution data to a first region surrounding the intersection point on the display screen and a second set of lower video resolution data to a second region of the video screen.

BRIEF DESCRIPTION OF THE DRAWINGS

For an understanding of the present invention, reference should be made to the following detailed description taken in connection with the accompanying drawings wherein.

DETAILED DESCRIPTION OF THE INVENTION

Figure 1:
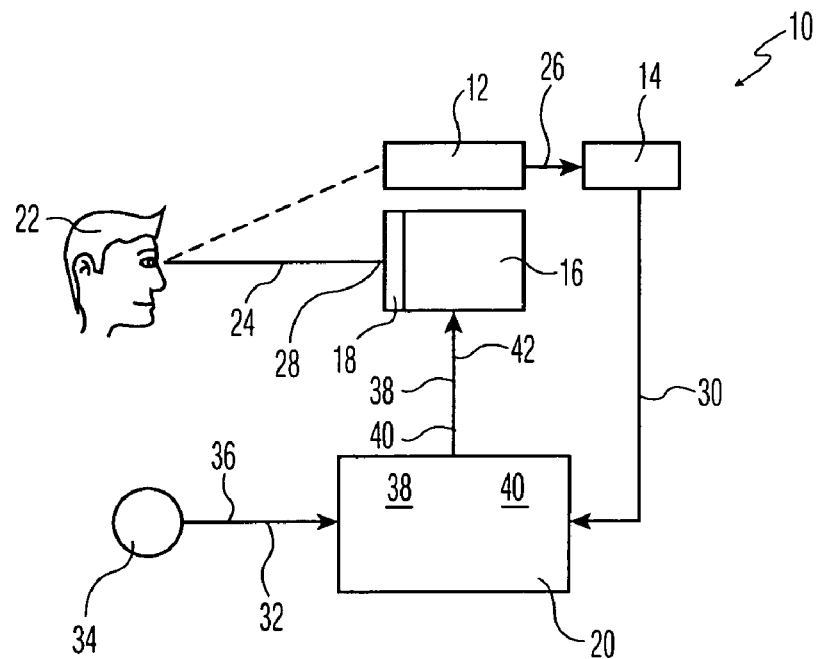
FIG. 1 illustrates a schematic view of a display system.
Figure 2:
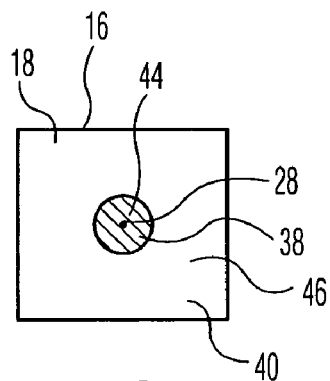
FIG. 2 illustrates a plan view of a display screen including a first region and a second region of differing resolutions.
Figure 3:
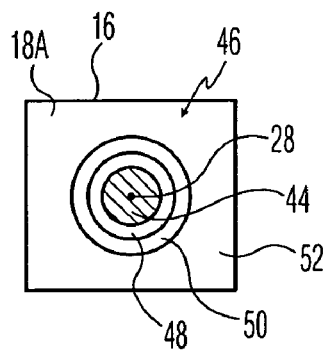
FIG. 3 illustrates the display screen of FIG. 2 including a plurality of regions with differing resolutions.

FIG. 1 illustrates a display system 10 including an eye tracking system 12, an eye-gaze tracking module 14, a display device 16, a display screen 18, and a scalable video decoder 20. A user 22 gazes along an eye-gaze direction line 24 at the display screen 18 of the display device 16. The display device 16 may be included in any suitable system (e.g., computer monitor, television, Personal Digital Assistant, etc.). The eye tracking system 12 determines the eye-gaze direction line 24 by any suitable means (e.g., eye pupil movement, infrared, bright eye affect, etc.). The eye tracking system 12 sends the eye-gaze direction line 24 information through a conduit 26 to the eye-gaze tracking module 14. The eye-gaze tracking module 14 extracts the eye-gaze direction line 24 information and determines an intersection point 28 where the eye-gaze direction line 24 intersects with the display screen 18 (FIGS. 1, 2 and 3). The scalable video decoder 20 receives the intersection point 28 data from the eye-gaze tracking module 14 through the conduit 30. The scalable video decoder 20 receives an encoded video stream 32 from an encoded video source 34. The encoded video source 34 may be any suitable source (e.g., digital versatile disk, high definition TV broadcast, internet, tape recorder, computer system, etc.). The encoded video stream 32 is carried from the encoded video source 34 through the conduit 36 to the scalable video decoder 20. The encoded video stream 32 may use any suitable video compression algorithm (e.g., MPEG-2, MPEG-4, H.263, etc.). MPEG-2 and MPEG-4 are compression standards of the Moving Picture Experts Group, and H.263 is a International Telecommunication Union compression standard.

The scalable video decoder 20 generates a first set of "foveal" vision or higher resolution data 38 and a second set of "peripheral" vision or lower resolution data 40. The second set of lower resolution data 40 may optionally include data producing a lower brightness image than the first set of higher resolution data 38. The first set of higher resolution data 38 and the second set of lower resolution data 40 are sent through the conduit 42 to the display device 16.

FIG. 2 illustrates the display screen 18 of the display device 16. The display screen 18 displays the first set of higher resolution data 38 in a first region 44 surrounding the intersection point 28. The intersection point 28 is the location where the user's 22 eye-gaze direction line 24 is intersecting with the display screen 18. The second set of lower resolution data 40 is displayed in a second region 46 of the display screen 18. The second region 46 surrounds the first region 44 in the display screen 18. Additionally, the second region 46 of the display screen 18 may be dimmer than the first region 44 of the display screen 18. The signal bandwidth and the bits of data necessary to create the screen display 18 is reduced by having the first and second regions 44 and 46 with different resolutions. For example, if the first and second regions 44, 46 where both at a high resolution of the 1024×780 pixels, the bandwidth and bits of data necessary would be greater than if the first region 44 had a resolution equivalent to 1024×780 pixels but the second region had a resolution equivalent to 640×480 pixels.

FIG. 3 illustrates another embodiment of a display screen 18A with the first region 44 surrounded by the second region 46 including a plurality of regions 48, 50 and 52. The regions 48–52 have a resolution lower than the resolution of the first region 44.

Figure 4:
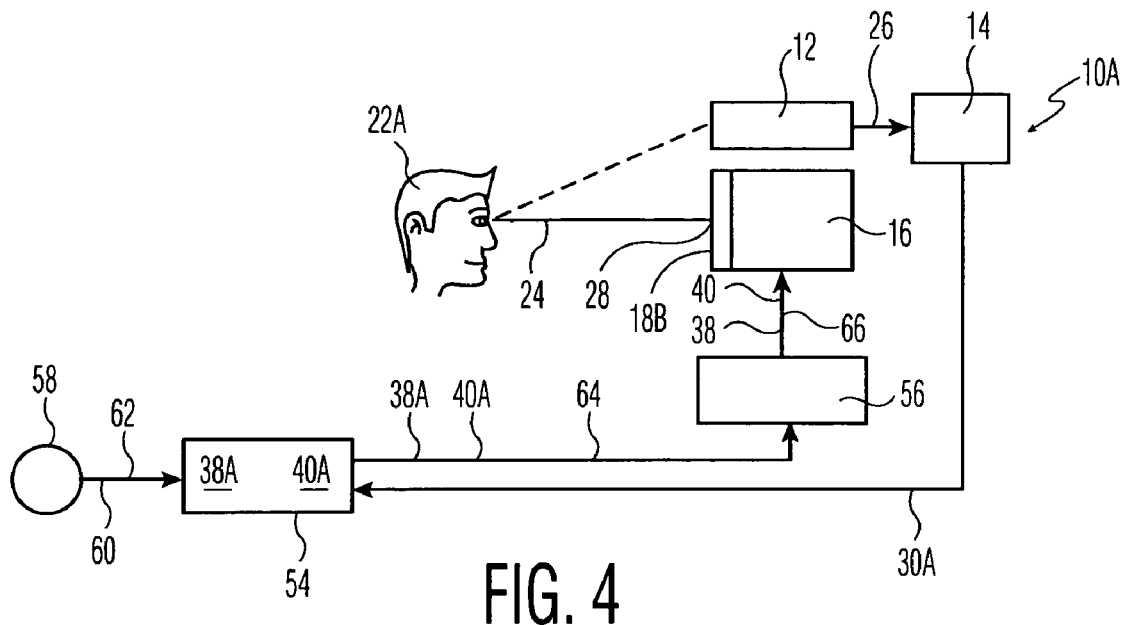
FIG. 4 illustrates another embodiment of a display system.
Figure 5:
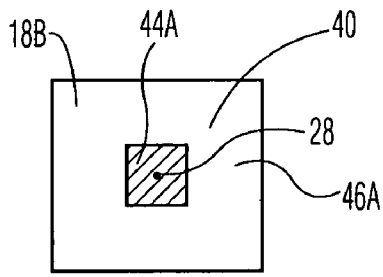
FIG. 5 illustrates a plan view of another embodiment of a display screen including a first region and a second region of differing resolutions.
Figure 6:
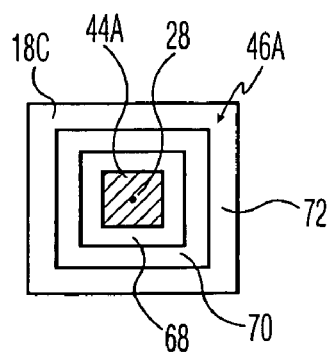
FIG. 6 illustrates the display screen of FIG. 5 including a plurality of regions with differing resolutions.

FIG. 4 illustrates another embodiment of a display system 10A. The display system 10A includes the eye tracking system 12, the display device 16, the display screen 18B, the eye-gaze tracking module 14, a scalable video encoder 54, and a remote video decoder 56. A user 22A gazes along the eye-gaze direction line 24 at the display screen 18B of the display device 16. The eye tracking system 12 determines the eye-gaze direction line 24 by any suitable means (e.g., eye pupil movement, infrared, bright eye affect, etc.). The eye tracking system 12 sends the eye-gaze direction line 24 information through conduit 26 to the eye-gaze tracking module 14. The eye-gaze tracking module 14 extracts the eye-gaze direction line 24 information and determines the intersection point 28 where the eye-gaze direction line 24 intersects with the display screen 18B (FIGS. 4, 5, and 6). The scalable video encoder 54 receives the intersection point 28 data from the eye-gaze tracking module 14 through the conduit 30A. The scalable video encoder 54 receives a source video stream 60 from a video source 58. The video source may be any suitable source (e.g., camera, video cassette recorder, television, etc.). The source video stream 60 is carried from the video source 58 to the scalable video encoder 54 through a conduit 62.

The scalable video encoder 54 generates a first set of encoded higher resolution data 38A and a second set of encoded lower resolution data 40A. The first set of encoded higher resolution data 38A and the second set of encoded lower resolution data 40A may use any suitable video compression algorithm (e.g., MPEG-2, MPEG-4, H.263, etc.). The second set of encoded lower resolution data 40A may optionally include data producing a lower brightness image than the first set of encoded higher resolution data 38A. The first set of encoded higher resolution data 38A and the second set of encoded lower resolution data 40A are sent through a conduit 64 to the remote video decoder 56. The video decoder 56 decodes the first set of encoded higher resolution data 38A and the second set of encoded lower resolution data 40A and transmits the first set of higher resolution data 38 and the second set of lower resolution data 40 through conduit 66 to the display device 16.

FIG. 5 illustrates the display screen 18B of the display device 16. The display screen 18 displays the first set of higher resolution data 40 in a first region 44A surrounding the intersection point 28. The intersection point 28 is the location where the user's 22A eye-gaze direction line 24 is intersecting with the display screen 18B. The second set of lower resolution data 40 is displayed in a second region 46A of the display screen 18B. The bandwidth and bits of data necessary to create the screen display 18B is reduced by having the first region 44A exhibit a higher resolution than the second region 46A.

FIG. 6 illustrates another embodiment of a display screen 18C with the first region 44A surrounded by the second region 46A including a plurality of regions 68, 70 and 72. The regions 68–72 have a resolution lower than the resolution of the first region 44A. Optionally, the regions 68–72 may be dimmer than the first region 44A.

While embodiments of the present invention have been described herein for purposes of illustration, many modifications and changes will become apparent to those skilled in the art. For example, the display device 16 may be included in any suitable system (e.g., computer monitor, television, Personal Digital Assistant, etc.). Accordingly, the appended claims are intended to encompass all such modifications and changes as fall within the true spirit and scope of this invention.

I claim:

1. An apparatus comprising:
    an eye tracking system for determining an eye-gaze direction line of a user looking at a display screen of a display device;
    an eye-gaze tracking module for extracting the eye-gaze direction from the eye tracking system and for determining the intersection point where the eye-gaze direction line intersects with the screen;
    wherein the eye-gaze tracking module sends the intersection point data to a scalable video decoder;
    wherein the scalable video decoder receives an encoded video stream and provides a first set of higher video resolution data for a first region surrounding the intersection point on the display screen and a second set of lower video resolution data to a second region of the video screen that is different than the first region; and
    wherein the second region on the video screen is dimmer than the first region on the video screen.

2. An apparatus comprising:
    an eye tracking system for determining an eye-gaze direction line of a user looking at a display screen of a display device;
    an eye-gaze tracking module for extracting the eye-gaze direction from the eye tracking system and for determining the intersection point where the eye-gaze direction line intersects with the screen;
    wherein the eye-gaze tracking module sends the intersection point data to a scalable video encoder;
    wherein the scalable video encoder receives a source video stream and provides an encoded first set of higher video resolution data for a first region surrounding the intersection point on the screen and an encoded second set of lower video resolution data is provided for a second region of the screen that is different than the first region; and
    wherein the second region on the video screen is dimmer than the first region on the video screen.

3. A method comprising:
    determining an eye-gaze direction line of a user looking at a display screen;
    determining an intersection point where the eye-gaze direction line intersects with the display screen;
    providing to the display screen a first set of higher video resolution data for a first region surrounding the intersection point on the display screen and a second set of lower video resolution data for a second region of the video screen that is different than the first region; and
    wherein the second region on the video screen is dimmer than the first region on the video screen.

* * * * *